Apr. 3, 1923
O. L. COX
GATE
Filed Nov. 15, 1920
1,450,486
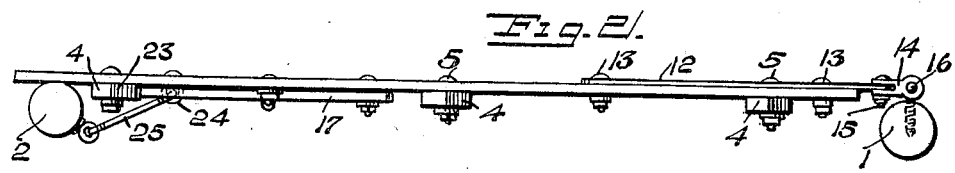
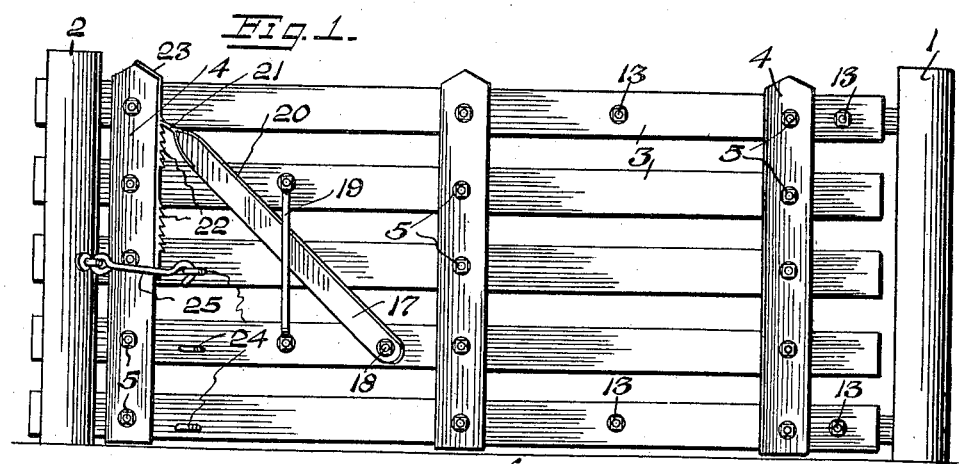
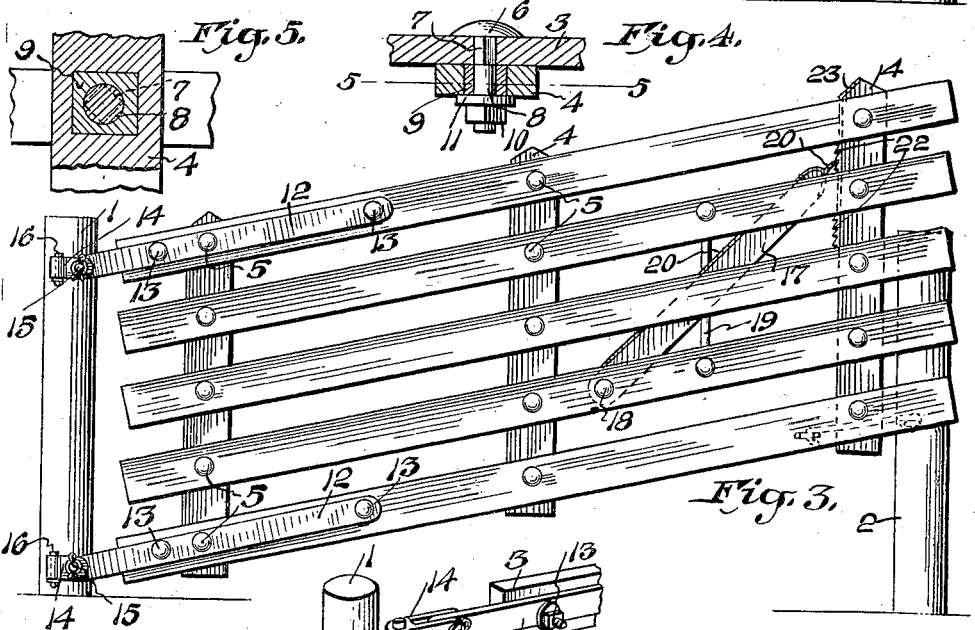
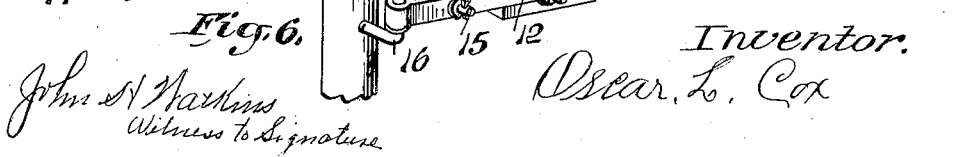
Inventor.
Oscar L. Cox Patented Apr. 3, 1923.

1,450,486

UNITED STATES PATENT OFFICE.

OSCAR L. COX, OF MEMPHIS, MISSOURI.

GATE.

Application filed November 15, 1920. Serial No. 424,371.

*To all whom it may concern:*

Be it known that I, OSCAR L. COX, a citizen of the United States, residing at Memphis, in the county of Scotland and State of Missouri, have invented certain new and useful Improvements in Gates; and I do hereby declare the following to be a full, clear, and exact description of the invention, such as will enable others skilled in the art to which it appertains to make and use the same.

This invention relates to an improved construction in gates and has special reference to the type of gate in which longitudinally extending bars are pivotally connected with vertically disposed standards and in which hinged members are carried by certain of the longitudinally extending bars to engage hinged members of a gate post to mount the gate for swinging movement.

One object of the invention is to provide a gate having an improved hinge construction in which there has been provided gate-engaging hinge bars which extend longitudinally of the gate and are secured to the upper and lower longitudinally extending bars thereof, the outer end portions of the hinge bars being pivotally connected with bearing brackets for vertical swinging movement and the bearing brackets being provided with vertically disposed sleeves for fitting upon vertically disposed pivot pins carried by the gate posts.

Another object of the invention is to so construct the bearing brackets that the gate carrying bars may have free vertical swinging movement to permit vertical adjustment of the gate and to further so construct these bearing brackets that they may fit loosely upon vertically disposed pivot pins of the post and thus permit the gate to have swinging movement in a horizontal direction.

Another object of the invention is to so construct the hinges that they may be very securely connected with the gate and to further so construct them that they may be very cheaply produced and be very strong and durable.

This invention is illustrated in the accompanying drawings, wherein:

Figure 1 is a view showing the improved gate in elevation.

Figure 2 is a top plan view of the gate.

Figure 3 is a view similar to Fig. 1 showing the gate swung to a raised position to permit small animals to pass under the gate.

Figure 4 is an enlarged sectional view showing the manner of connecting the vertically disposed bars with the horizontally disposed bars.

Figure 5 is a sectional view taken along the line 5—5 of Fig. 4.

Figure 6 is a perspective view showing the hinged mounting for the upper end portion of the gate.

This improved gate is to be hingedly mounted so that it may have swinging movement into and out of a closing position between the posts 1 and 2. It is to be so constructed that the bars 3 which are connected with the vertically disposed bars 4 may extend horizontally as shown in Fig. 1 or may be supported in an elevated position as shown in Fig. 3. It is of course obvious that if desired for any reason, the bars 3 may be permitted to slant downwardly instead of upwardly but in the present illustration, the bars 3 have been shown inclined upwardly and the gate supported in this position so that hogs and other small animals may be permitted to pass beneath the gate when the gate is closed to prevent passage of horses, cows and other large animals. In order to pivotally connect the longitudinally extending bars 3 with the vertically disposed bars 4, there has been provided bolts 5 each of which will be constructed and mounted as shown in Figs. 4 and 5. Each of these bolts is provided with a large head 6 and with a stem having the portion 7 adjacent the head rectangular in cross section so that when the bolt is passed through a similarly shaped opening in the longitudinally extending bar 3, the bolt will be prevented from having rotary movement in the bar. The portion 8 of the bolt which is to extend through the vertically disposed bar 4 is circular in cross section and passes through a circular opening formed in a bearing block or bushing 9 which is rectangular in shape as shown in Fig. 5 and is mounted in a similarly shaped opening formed in the vertically disposed bar. It will thus be seen that since the bolt turns in this metal block 9 and the wearing is not against the wood from which the bar 4 is formed, a gate will be provided having a very strong structure. With the securing nuts 10 in place and holding the washer 11 against the outer face of the vertically disposed bar, the block 9 will be held in place and cannot work out of the opening which receives this block. Metal bars or strips 12 are secured to the upper and lower horizontally extending bars 3 by means of certain of the bolts 5 and by other securing bolts 13 and these bars 12 which serve to strengthen the gate at the point of greatest strain extend beyond the ends of the bars 3 to which they are secured and are pivotally connected with the hinges 14 by pivot pins 15. Since the hinges 14 are mounted upon the vertically disposed end portions of the pintles 16 and are connected with the strips 12 by pivot pins 15 which extend at right angles to the vertically disposed end portions of the pintles 16, it will be noted that the gate may have swinging movement in a substantially horizontal position and may also have vertical swinging movement. The bolts 13 which serve to secure the strips 12 in place may have an ordinary bolt construction, but the bolts 5 which pass through these strips will have a construction similar to the remaining bolts 5 and the strips 12 will extend between the horizontal bar 3 and the head 6 of the bolt. In order to retain the gate in a vertically adjusted position as shown in Fig. 3 there has been provided a supporting bar 17 which is pivotally connected with one of the bars 3 as shown at 18 and extends through a guide 19 carried by certain of the bars 3. This supporting bar 17 is provided with a binding strip or shoe 20 which extends longitudinally of the bar 17 upon its upper edge and has its end portions extending about the ends of the bar. At the forward end of the bar 17, this binding strip or shoe 20 is provided with an extension or spur 21 for engaging the teeth of racks 22 formed upon the strip 23 carried by one of the vertically disposed bars 4. When the gate is lifted to the position shown in Fig. 3, the spur or pawl extension 21 will engage the teeth of one of the racks 22 and the gate will be suspended in this position. A plurality of eyes 24 have been provided so that the gate may be secured in a closed position by means of the hooks 25 with the gate either in the horizontal position shown in Fig. 1 or in a raised position.

There has thus been provided a gate which will be vertically adjustable and will not only have its upper and lower portions strongly braced at the hinged ends but will further have the horizontally extending bars 3 connected with the bars 4 in a very efficient manner by bolts which are mounted in a very efficient manner.

I claim:

In a gate structure, horizontally disposed bars pivotally connected to spacer vertical bars, metallic strips rigidly carried by certain of the horizontal bars and extending rearwardly of the gate, bifurcated hinge members pivoted at one end to said strips transversely of the gate and provided at their opposite ends with vertical sleeve portions for fitting upon L-shaped pintles extending transversely from the gate post, said gate being capable of movement with respect to either of said pivots independent of the other of said pivots.

OSCAR L. COX.